United States Patent [19]

Wodeslavsky

[11] Patent Number: 4,566,556
[45] Date of Patent: Jan. 28, 1986

[54] ANTI-THEFT APPARATUS FOR MOTOR VEHICLES

[75] Inventor: Josef Wodeslavsky, Tenafly, N.J.

[73] Assignee: Autoloc Corporation, Tel Aviv, Israel

[21] Appl. No.: 607,801

[22] Filed: May 4, 1984

Related U.S. Application Data

[63] Continuation-in-part of Ser. No. 430,591, Sep. 30, 1982, abandoned.

[30] Foreign Application Priority Data

Aug. 19, 1983 [IL] Israel .................................. 69527

[51] Int. Cl.$^4$ ............................................. B60R 25/04
[52] U.S. Cl. ........................................ 180/287; 70/237
[58] Field of Search ............... 180/287; 70/179, 220, 70/207, 242, 237; 137/384.6; 123/198 B

[56] References Cited

U.S. PATENT DOCUMENTS

| | | | |
|---|---|---|---|
| 3,463,262 | 8/1969 | Stortz, Sr. ......................... | 180/287 |
| 3,622,718 | 11/1971 | Lipschutz ......................... | 180/287 |
| 3,630,306 | 12/1971 | Shur .................................. | 180/287 |
| 3,669,210 | 6/1972 | Haefner ........................... | 180/287 |
| 3,700,063 | 10/1972 | Dunseath .......................... | 180/287 |
| 3,907,060 | 9/1975 | Burton et al. .................... | 180/287 |
| 4,084,657 | 4/1978 | Bradley et al. .................. | 180/287 |
| 4,096,930 | 6/1978 | Viscardi ........................... | 180/287 |
| 4,446,950 | 5/1984 | Wise et al. ....................... | 180/287 |

*Primary Examiner*—Richard A. Bertsch
*Attorney, Agent, or Firm*—Benjamin J. Barish

[57] ABSTRACT

Anti-theft apparatus is described for use in motor vehicles which include a vacuum source generating a vacuum when the vehicle engine is running. The anti-theft apparatus comprises a disabling device for disabling normal operation of the vehicle, a releasing device for releasing the latter to permit normal operation of the vehicle, and a vacuum control device which includes a manipulatable member, in the form of a removable piston-key, effective to connect the vacuum source to the releasing device, to cause it to release the disabling device and thereby to permit normal operation of the vehicle, only when the piston-key is in a preselected position in the vacuum control device. In one form, the disabling device acts on the gearshift lever locking it in its park position, and in a second form it acts on the fuel feed line blocking the full flow of fuel to the engine.

14 Claims, 8 Drawing Figures

ANTI-THEFT APPARATUS FOR MOTOR VEHICLES

RELATED APPLICATIONS

This application is a continuation-in-part of U.S. patent application Ser. No. 06/430,591 filed Sept. 30, 1982, which application is now abandoned.

BACKGROUND OF THE INVENTION

The present invention relates to anti-theft apparatus for motor vehicles.

A large number of anti-theft devices have been designed for motor vehicles, but the known devices are still not entirely satisfactory. Thus, one of the big disadvantages in many of such devices is that they can be easily by-passed by a skilled thief. Another disadvantage is that in the event of malfunction of the device during the operation of the vehicle, such malfunction may also terminate the continued operation of the vehicle, which could result in considerable inconvenience or even danger to the occupants.

An object of the present invention is to provide new anti-theft apparatus having advantages in the above respects.

SUMMARY OF THE INVENTION

According to a broad aspect of the invention, there is provided an anti-theft apparatus for a motor vehicle, including a vacuum source for generating a vacuum when the vehicle engine is running, the anti-theft apparatus comprising: a disabling device for disabling normal operation of the vehicle; a releasing device for releasing the disabling device to permit normal operation of the vehicle; and a vacuum control device between the vacuum source and the releasing device. The vacuum control device includes a cylinder and a piston receivable therein, one of which constitutes a key manually removable by the operator whenever it is desired to disable the normal operation of the vehicle. In the described preferred embodiments, the piston constitutes the removable key. A vacuum connection is provided from the vacuum source to the releasing device via the cylinder. Both the cylinder and piston include bores located so as to become aligned, and thereby to establish a vacuum connection through the cylinder, only when the key is in place, i.e. the piston, in the described preferred embodiments, is in the cylinder of the vacuum control device.

In one described embodiment, the disabling device is the vehicle gearshift lever which when in Park position, locks the vehicle transmission; and in a second described embodiment, the disabling device comprises a fuel blocking member in the fuel line which normally blocks the full flow of fuel to the vehicle engine.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
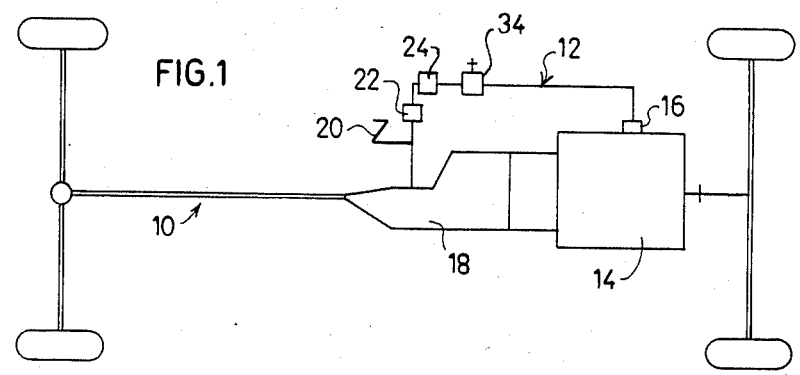
FIG. 1 schematically illustrates one form of motor vehicle equipped with anti-theft apparatus constructed in accordance with the invention.

With reference to FIG. 1, there is shown a vehicle, schematically indicated at 10, equipped with anti-theft apparatus generally designated 12. The vehicle 10 includes an engine 14 having a vacuum source 16, such as a vacuum manifold generating a vacuum when the engine is operating, and a transmission 18 controlled by a gearshift-lever 20. Briefly, the anti-theft apparatus 12 includes a locking device 22 for locking the gearshift-lever 20 in its "Park" position which thereby also locks the transmission to prevent movement of the vehicle, and a releasing device 24 for releasing the locking device 22 when subjected to a vacuum from source 16 via a vacuum control device 34.

Figure 2:
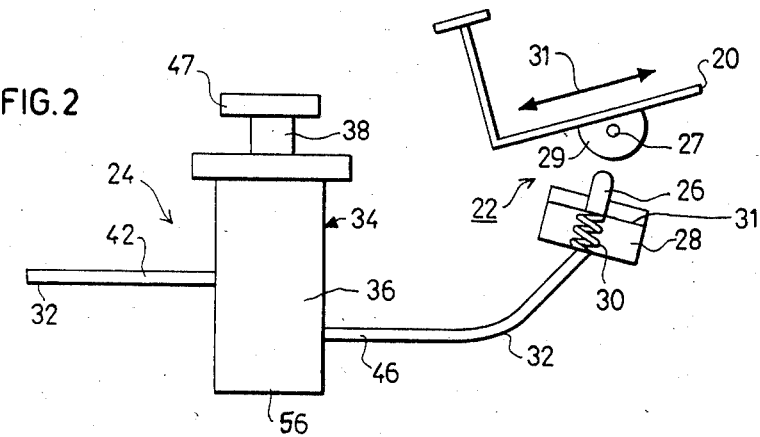
FIGS. 2 and 3 schematically illustrate the anti-theft apparatus in its releasing and locking positions, respectively.
Figure 3:
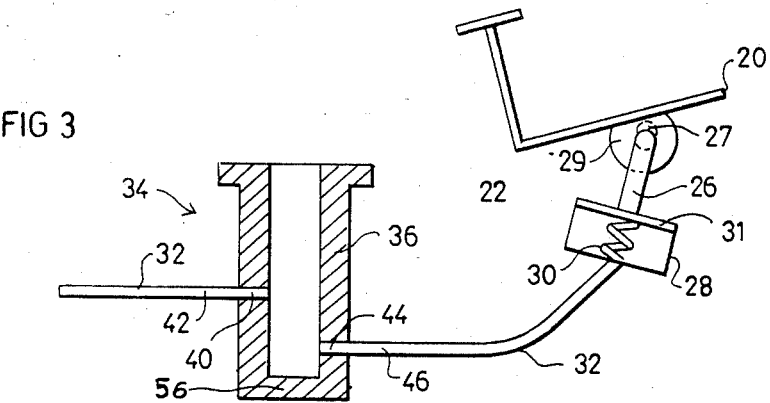

The locking device 22 includes a locking bar 26 urged by a spring 30 to the extended position illustrated in FIG. 3, wherein bar 26 is received within a hole or recess 27 formed in a plate 29 depending from the gearshift-lever 20 to lock the latter in its Park position. Locking bar 26 is coupled to a diaphragm 31 closing a chamber 28, such that when a vacuum is applied to chamber 28, the locking bar 26 is retracted, moving out of hole 27 (FIG. 2), thereby releasing the gearshift-lever 20 for movement, as shown by arrow 31, to another position (e.g., the Drive position), unlocking the transmission and permitting the vehicle to move.

Figure 4:
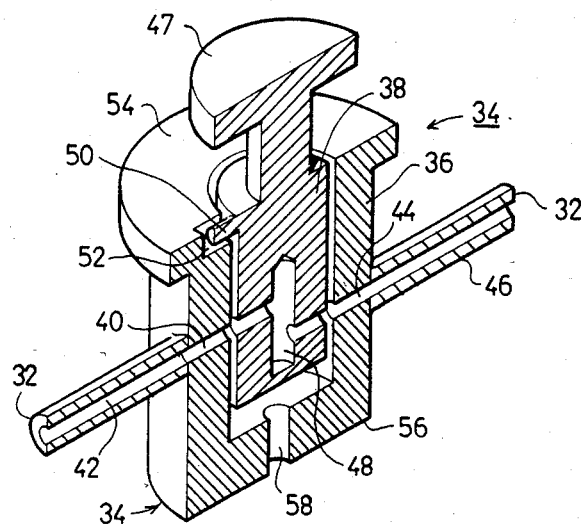
FIG. 4 is a sectional view of the cylinder and piston in the anti-theft apparatus shown in FIGS. 2 and 3.
Figure 5:
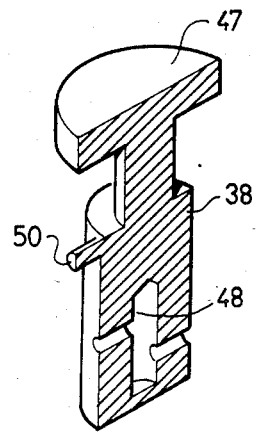
FIG. 5 is a sectional view only of the piston of FIG. 4, which piston constitutes the manipulatable member or personalized key removable by the operator to prevent operation of the vehicle.

Releasing chamber 28 is connected to the vacuum source 16 via a vacuum connection 32 and vacuum control device 34, constituted of a cylinder 36 and a removable piston 38. As shown particularly in FIG. 4, the opposite sides of cylinder 36 are formed with an inlet bore 40 connected to the upstream conduit 42 and with an outlet bore 44 connected to the downstream conduit 46. Piston 38 includes a manually-grippable head 47 and bores 48 adapted to be aligned with the inlet and outlet bores 40, 44 of cylinder 36 when the piston is in proper position within the cylinder. For this purpose, piston 38 includes a pin 50 received within a radial groove 52 formed in the upper end 54 of cylinder 36. In addition, the bottom wall 56 of cylinder 36 is formed with a further bore 58 which continuously vents the interior of the cylinder to the atmosphere unless occupied by the piston 38.

The anti-theft device illustrated in FIGS. 1–5 may be used in the following manner:

Normally, when the vehicle is not operating, its gearshift-lever 20 is in the Park position. Since the vehicle is not operating, no vacuum is generated by source 16, so that locking bar 26 is spring-urged to its extended position received within hole 27 of plate 29 attached to the gearshift-lever 20, thereby locking the gearshift lever in this Park position. This locks the vehicle transmission and prevents the vehicle from moving.

The operator may remove piston 38 of the vacuum control device 34 to prevent the theft of the vehicle. Thus, even if an unauthorized person succeeds in starting the engine, the absence of piston 38 from cylinder 36 would prevent the transmission of the vacuum from source 16 to withdraw the locking bar 26, which is necessary in order to release the gearshift-lever for movement to the Drive position. Even if the unauthorized person attempts to cover the open end of cylinder 36, this would still not cause the vacuum source 16 to withdraw the locking bar 26 because port 58 of the cylinder would vent the vacuum to the atmosphere.

Whenever the authorized user wishes to start the vehicle, he merely reinserts piston 38 into cylinder 36, and then starts the engine by the usual ignition key, whereupon the vacuum generated by source 16 is transferred via bores 40, 44, and 48 of cylinder 36 and piston to chamber 28 to withdraw the locking bar 26 and thereby release the gearshift lever 20 for shifting to the Drive or other position enabling the vehicle to be operated.

Should there be a malfunction in the anti-theft device while the vehicle is being operated, such that the vacuum is no longer transmitted from source 16 to chamber 28, locking bar 26 will tend to move towards its extended position; but it will no longer be aligned with hole 27 in plate 29 of the gearshift lever 20 (this alignment being present only in the Park position), and therefore will not be able to lock the gearshift lever in place. Accordingly, such a malfunction will not prevent the continued operation of the vehicle. Nor will the malfunction prevent the operator from parking and subsequently using the vehicle even while this malfunction condition exists since all that is required is that the operator leave the gearshift-lever in its Neutral position rather than in its Park position. The anti-theft device can be similarly disabled by the operator if, for example, he wishes to leave his vehicle in a parking lot or the like and to permit the lot attendant to move his vehicle, but not to leave with him or in the vehicle the piston 38 removed from cylinder 36.

It will thus be seen that the piston 38 serves as a second key, in addition to the ignition key, which must be properly inserted for operation of the vehicle. Piston 38 can be "personalized" for individual automobiles by merely changing the location of the cylinder bores 40, 44, and piston bore 48, such as to transfer the vacuum from the source 16 only when the proper piston 38 is inserted into its respective cylinder 36.

Figure 6:
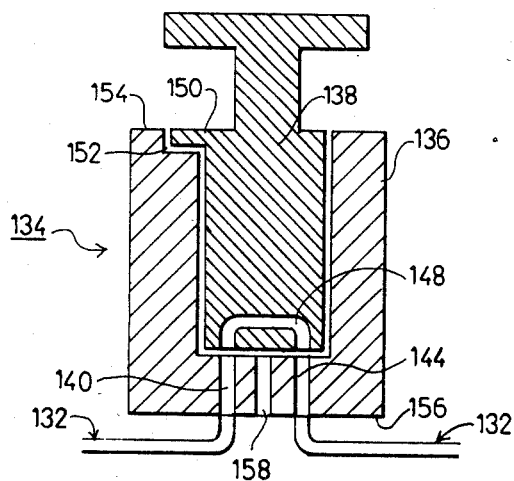
FIG. 6 is a sectional view illustrating another form of manipulatable member arrangement which may be used.

Another example of an arrangement that can be used is illustrated by valve 134 shown in FIG. 6, which valve also includes a cylinder 136 and a piston 138 establishing communication between the two portions of the vacuum conduit 132. Thus, in the FIG. 6 arrangement, the inlet and outlet bores 140, 144 are formed in the bottom wall of cylinder 136, and the connecting bore 148 is formed in the bottom portion of piston 138 so as to establish communication between bores 140 and 144 when the piston is located in its proper longitudinal and angular position within cylinder 136. Piston 138 also includes a rib 150 received within a recess 152 formed in the upper end of cylinder 136, for locating the piston 136 in proper position in cylinder 136 to establish communication between the cylinder bores 140 and 144. Further, the bottom wall 156 of the cylinder is also formed with a port 158 which vents the interior of the cylinder to the atmosphere except when piston 138 is disposed within the cylinder.

It will be appreciated that the piston (38 or 138) may be manipulated by merely rotating it, i.e., without removing it from its respective cylinder, in order to align the bores establishing communication between the vacuum source 16 and the releasing mechanism. Preferably, the vacuum cylinder (36, 136) is located in the driver's compartment to provide convenient access to it when locking or releasing the vehicle for operation.

Figure 7:
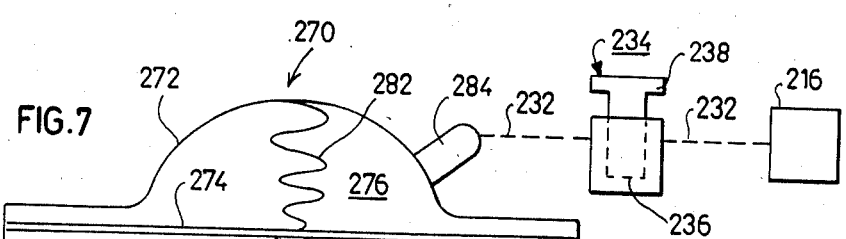
FIGS. 7 and 8 illustrate another disabling arrangement, in the form of a fuel blocking member which in its normal position (FIG. 7) blocks the full flow of fuel to the vehicle engine, but which in its released position (FIG. 8), permits normal vehicle operation.
Figure 7:
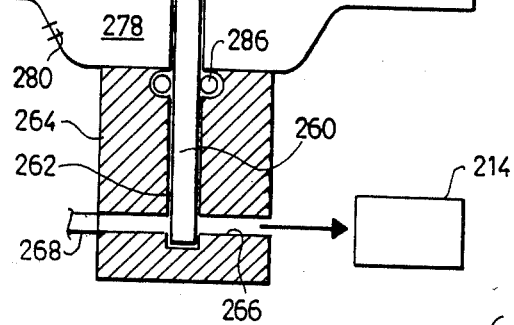
Figure 8:
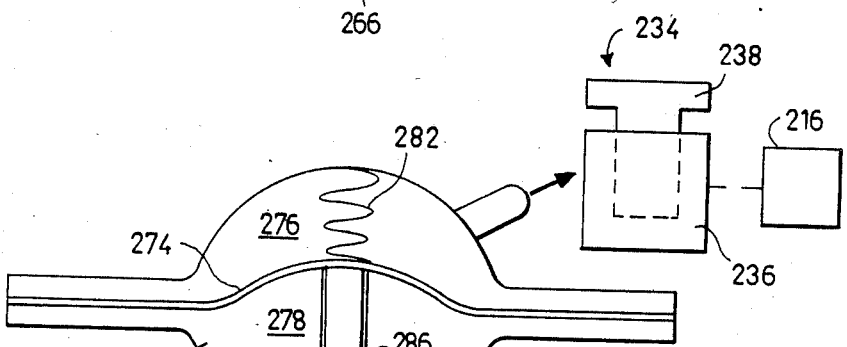
Figure 8:
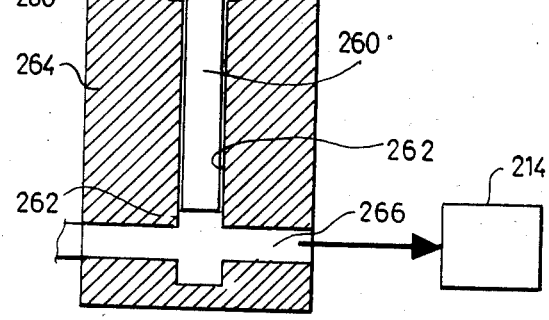

FIGS. 7 and 8 illustrate a second embodiment of the invention, wherein the vehicle is disabled by cutting-off the supply of fuel to the engine.

FIGS. 7 and 8 schematically show the vehicle engine 214 and the vacuum source 216 connected to it so as to generate a vacuum when the vehicle engine is running, the vacuum source 216 being in turn connected via vacuum ducts 232 to the vacuum control device 234 including cylinder 236 and manipulatable piston 238, as described above in connection with FIGS. 1-6. Here, however, the disabling device is in the form of a rod 260 which is normally positioned so as to block the full flow of fuel to the vehicle engine 214, but is movable, by a releasing device generally designated 270, to permit the full flow of fuel to the vehicle engine, and thereby to permit the normal operation of the vehicle.

More particularly, rod 260 is movable within a longitudinally-extending bore 262 formed in housing 264, the latter housing also being formed with a transversely-extending bore 266 intersecting the lower end of bore 262. One end of bore 266 is connected to the fuel supply line 268, and the other end is connected to the vehicle engine 214.

The releasing device 270 comprises another housing 272 supporting a diaphragm 274 dividing its interior into two chambers 276 and 278. Rod 260 is secured or otherwise coupled to the lower face of diaphragm 274 and extends through chamber 278 into bore 262 of housing 264, chamber 278 being vented by port 280 to the atmosphere. The opposite chamber 276 includes a spring 282 biasing diaphragm 274 to project rod 260 into the transverse bore 266 of housing 264, as shown in FIG. 7. Chamber 276, however, further includes a port 284 connected to the vacuum source 216 via vacuum duct 232 and the vacuum control device 234, such that when chamber 276 is subjected to a vacuum from the vacuum source 216, diaphragm 274 is urged, against the force of spring 282, to move rod 262 out of bore 266, as shown in FIG. 2.

A seal 286 in bore 262 seals the upper end of rod 260. However, the lower end of the rod, even when in its blocking position illustrated in FIG. 1, does not completely seal bore 266, but rather permits a relatively small flow of fuel to pass to the engine 214 for purposes of starting and idling the engine, but not sufficient to permit full operation of the engine.

The apparatus illustrated in FIGS. 7 and 8 operates as follows:

When the vehicle engine 214 is not operating, spring 282 urges diaphragm 274 and rod 260 to the blocking position of the rod as illustrated in FIG. 7, wherein the rod blocks the full flow of fuel via bore 266 to the vehicle engine. However, bore 266 is not completely blocked, as described above, but permits sufficient fuel to pass from the fuel supply line 268 to the engine to start the engine and also to permit it to idle.

Thus, the operator can start the engine by the use of the normal ignition key. If the manipulatable piston 238 is in proper position in cylinder 236, the vacuum generated in source 216 is transmitted via port 284 to chamber 276, thereby displacing diaphragm 274 and rod 260 to the position illustrated in FIG. 8, permitting the full flow of fuel via bore 266 to the vehicle engine 214. However, if piston 238 is not in its proper position, the vacuum from source 216 is not transmitted to chamber 276, and therefore spring 282 retains rod 260 in its blocking position illustrated in FIG. 7 to block the full flow of the fuel to the engine.

Should there occur a malfunction in the vacuum system while the vehicle is operating normally, with rod 260 in the released condition as illustrated in FIG. 8, the fuel pressure in the fuel line 266, applied to the lower face of rod 266, would be sufficient to retain the rod in its releasing position, against the action of spring 282, so that normal operation of the vehicle can continue even under this malfunction condition. However, as soon as the engine ceases to run, the fuel pressure drops, thereby permitting rod 260 to drop to its locking position as illustrated in FIG. 7 and disabling the further operation of the motor vehicle until piston 238 is properly positioned in cylinder 236 to re-establish the vacuum connection from source 216 to chamber 276, as described above.

What is claimed is:

1. Anti-theft apparatus for a motor vehicle, including a vacuum source for generating a vacuum when the vehicle engine is running, said anti-theft apparatus comprising: a disabling device for disabling normal operation of the vehicle; a releasing device for releasing said disabling device to permit normal operation of the vehicle; and a vacuum control device between said vacuum source and said releasing device, said vacuum control device including a cylinder and a piston receivable therein, one of said cylinder and piston constituting a key manually removable by the operator whenever it is desired to disable the normal operation of the vehicle, and a vacuum connection from said vacuum source to said releasing device via said cylinder, said cylinder and piston including bores located so as to become aligned, and thereby to establish a vacuum connection through said cylinder, only when said key is in said vacuum control device.

2. The device according to claim 1, wherein said cylinder is formed with a further bore vented to the atmosphere except when the cylinder is occupied by the piston.

3. The device according to claim 1, wherein said piston is said key removable from said cylinder and includes a rib received in a recess formed in said cylinder to locate the piston in a preselected position when inserted into said cylinder.

4. Apparatus according to claim 1, wherein said disabling device for disabling normal operation of the vehicle locks the vehicle against movement.

5. Apparatus according to claim 4, wherein said disabling device comprises a locking bar normally urged to lock the vehicle gearshift lever in its park position, but is moved to release the gearshift lever when the removble piston is received within said cylinder so that said vacuum source is connected to apply a vacuum to said releasing device.

6. The device according to claim 1, wherein said disabling device comprises a fuel blocking member in the fuel line which blocking member normally blocks the full flow of fuel to the vehicle engine, and permits only a small flow for motor-starting and idling purposes; said releasing device comprising a displaceable member coupled to said fuel blocking member to withdraw same and to permit full flow of fuel to the vehicle engine when said key is in a preselected position in said vacuum control device.

7. Apparatus according to claim 6, wherein said displaceable member comprises a diaphragm displaceable within a housing, one side of said diaphragm defining a chamber connected to said vacuum source via said vacuum control device when the said key is in said preselected position, the other side of said diaphragm being coupled to said fuel blocking member.

8. Anti-theft apparatus for a motor vehicle, including a vacuum source for generating a vacuum when the vehicle engine is running, said anti-theft apparatus comprising: a disabling device for disabling normal operation of the vehicle; a releasing device for releasing said disabling device to permit normal operation of the vehicle; and a vacuum control device between said vacuum source and said releasing device, said vacuum control device including a a cylinder, a piston receivable within said cylinder and manually removable therefrom, and thereby constituting a key manually removable by the operator whenever it is desired to disable the normal operation of the vehicle, and a vacuum connection from said vacuum source to said releasing device via said cylinder, said cylinder and piston including bores located so as to become aligned, and thereby to establish a vacuum connection through said cylinder, only when the piston is in said cylinder.

9. The device according to claim 8, wherein said cylinder is formed with a further bore vented to the atmosphere except when the cylinder is occupied by the piston.

10. The device according to claim 8, wherein said removable piston includes a rib received in a recess formed in said cylinder to locate the piston in said preselected position when inserted into said cylinder.

11. Apparatus according to claim 8, wherein said disabling device for disabling normal operation of the vehicle locks the vehicle against movement.

12. Apparatus according to claim 11, wherein said disabling device comprises a locking bar normally urged to lock the vehicle gearshift lever in its park position, but is moved to release the gearshift lever when the removable piston is received within said cylinder so that said vacuum source is connected to apply a vacuum to said releasing device.

13. The device according to claim 8, wherein said disabling device comprises a fuel blocking member in the fuel line which blocking member normally blocks the full flow of fuel to the vehicle engine, and permits only a small flow for motor-starting and idling purposes; said releasing device comprising a displaceable member coupled to said fuel blocking member to withdraw same and to permit full flow of fuel to the vehicle engine when said piston is received within said cylinder of said vacuum control device.

14. Apparatus according to claim 13, wherein said displaceable member comprises a diaphragm displaceable within a housing, one side of said diaphragm defining a chamber connected to said vacuum source via said vacuum control device when said piston is received within said cylinder, the other side of said diaphragm being coupled to said fuel blocking member.

* * * * *